No. 620,484.  
P. MUELLER.  
CLOSET REPAIRER.  
(Application filed Oct. 21, 1898.)

Patented Feb. 28, 1899.

(No Model.)

Attest  
Nora Graham.  
Ina Graham.

INVENTOR  
PHIL. MUELLER.  
by L. P. Graham  
his attorney

UNITED STATES PATENT OFFICE.

PHILLIP MUELLER, OF DECATUR, ILLINOIS.

CLOSET-REPAIRER.

SPECIFICATION forming part of Letters Patent No. 620,484, dated February 28, 1899.

Application filed October 21, 1898. Serial No. 694,227. (No model.)

*To all whom it may concern:*

Be it known that I, PHILLIP MUELLER, of the city of Decatur, county of Macon, and State of Illinois, have invented a certain new and useful Device for Repairing Broken Spuds of Sanitary Closets, of which the following is a specification.

This invention is intended to provide a repair-section that may be fastened firmly to the closet-bowl with its bearing-surface conforming accurately to the broken surface of the spud, that will exert equal pressure on both its connections with the bowl, that will compensate for irregularities in the original surface of the bowl and the broken surface of the spud, and that will offer a minimum obstruction to the passage of water.

It is exemplified in the structure hereinafter described, and it is defined in the appended claim.

Figure 1:
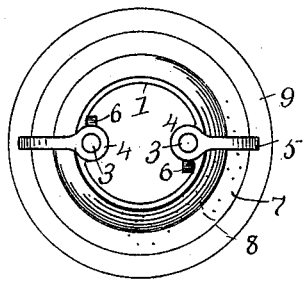
Figure 2:
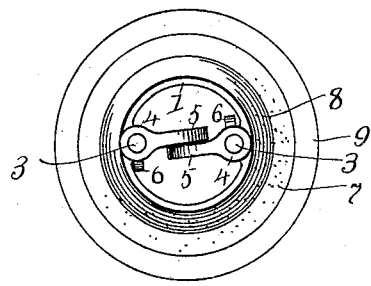
Figure 3:
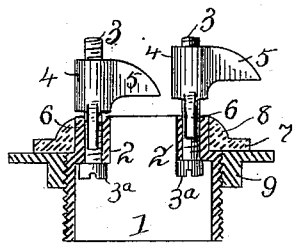

In the drawings forming part of this specification, Figure 1 is an end view of the repairer with the clamp-nuts in position to engage the bowl. Fig. 2 is a similar view with the clamp-nuts in the position they occupy while the repairer is being inserted through the opening in the bowl. Fig. 3 is a diametrical section through the shell of the repairer and the nut thereon, showing one of the clamp-nuts turned outward and the other turned inward.

The body of the device is a shell or short section of pipe, as 1, threaded externally and provided on two opposite sides with inward-extended bearings 2, which are bored parallel with the axis of the shell. The bearings 2 are at the inner end of the shell—that is, the end that is inserted into the bowl-opening—and they receive threaded bolts 3. The heads of the bolts bear against members 2 and their threaded ends extend beyond the inner end of the shell for a considerable portion of their lengths. Internally-threaded nuts 4 are screwed onto the extended ends of bolts 3, and such nuts are provided with clamp extensions 5 and stop extensions 6. The clamp extensions project radially from sides of the nuts above or beyond the inner ends of the shell and the stop projections extend sidewise and downward from the nuts in approximately right angles with the clamp extensions when the repairer is viewed from the end. The stop projections have a further peculiarity in that the angles they form with the clamp extensions are approximately ninety degrees measured from the stop projections to the clamp extensions in the direction the bolts turn when tightening the nuts and about two hundred and seventy degrees measured in the opposite direction. This peculiarity permits the clamp extensions to be swung inward or across the end of the shell, as shown in Fig. 2, by turning them in a direction contrary to the screwing action of the bolts and also permits them to turn with the screwing motion of the bolts to the position shown in Fig. 1, but no farther. The shell has a nut 9 on its externally-threaded periphery and a washer or gasket, as 7 and 8, is placed against nut 9 over the inner end of the shell. The washer or gasket is preferably made of rubber, and it consists of the flat annular portion 7 and conoidal portion 8, having its oblique surface presented in a direction parallel with the axis of the shell.

In attaching the repairer to a bowl the spud of which is broken off the clamp-nuts are set pretty well out on the ends of the bolts and the clamp extensions thereon are turned inward across the shell, as shown in Fig. 2. The repairer is then inserted through the opening in the bowl until the gasket bears against the broken surface and the clamp extensions are past the opening, when a screw-driver is set into the groove in the head 3ª of one of the bolts 3 and turned in the direction to force the bolt into its nut. The initial motion of the bolt carries the nut around with the bolt until the stop projection of the bolt strikes the wall of shell 1 and precludes further motion of the nut, after which the bolt is turned in the nut until the clamp extension of the nut bears against the surface of the bowl. The other bolt is then tightened up with the same preliminary turn of the clamp extension into operative position, and finally nut 9 is set up and the gasket is forced into and against the broken surface of the spud. The clamp extensions bring both sides of the gasket against the broken surface with equal firmness whatever may be the condition of the internal surface of the bowl or the direction of break of the spud, and so the preliminary for a complete and perfect joint is made.

What I claim is—

In a closet-repairer, the combination of a shell, threaded bolts having bearings in the shell parallel with the axis thereof, nuts on the bolts, lateral clamp extensions on the nuts and stops on the nuts to prevent the clamp extensions from swinging outward beyond approximately radial positions, substantially as set forth.

In testimony whereof I sign my name in the presence of two subscribing witnesses.

PHILLIP MUELLER.

Witnesses:
MINNIE P. HOIT,
ROBT. MUELLER.